MARGARINE OIL

Herbert Willem Lincklaen Westenberg, Vlaardingen, Netherlands, assignor to Lever Brothers Company, New York, N.Y.
No Drawing. Filed Feb. 27, 1968, Ser. No. 713,268
Claims priority, application Luxembourg, Feb. 27, 1967, 53,075
Int. Cl. A23d 3/00
U.S. Cl. 99—122                                                    9 Claims

ABSTRACT OF THE DISCLOSURE

A fat blend suitable for use as the fat phase in margarine contains specified proportions of an interesterified mixture of a liquid fat containing at least 40% poly-unsaturated fatty acids with a fat hardened to melt at 42–48° C. and containing at least 10% of $C_{20}$ to $C_{22}$ acids. Additional fats make up the blend to give dilatation values affording a spreadable margarine without incurring the effects of oil exudation and preferably comprise vegetable fats hardened to melt at 32–38° C. with up to 10% of others hardened to 42–48° C. which may themselves be interesterified.

---

The present invention relates to improved fat compositions which may be used in the preparation of margarines having a high content of poly-unsaturated fatty acids and to margarine made therefrom.

The term "fats" refers herein both to fatty acid glycerides which are solid at 20° C., as well as to those which at that temperature being liquid are commonly described as oils. A margarine fat is a fat blend which is suitable for use as the sole fat in margarine.

Margarines with a high content of poly-unsaturated fatty acids, and a relatively low content of saturated fatty acids are widely believed to be dietetically beneficial and are therefore of particular interest. However, such margarines should be easily spreadable without being oily at room temperatures, and this consistency requirement sets a limit to the content in the margarine of liquid fat, especially when the margarine is marketed wrapped in packages. When margarines containing a high amount of liquid fat are stored at temperatures of 20° C. or more, oil exudation may occur and as a result of the weight of one package on another oil may leak through the parchment wrap and by exposure to the air become rancid.

Since edible liquid fat is the source of poly-unsaturated fatty acids, there is thus a limit to the content of these acids in commercially acceptable margarine, especially when wrapped. However, a relatively high content of poly-unsaturated fatty acids and a relatively low content of saturated fatty acids would be represented by a margarine having a poly-unsaturated fatty acid content of 25% or more and a saturated fatty acids content of at most 30% based on the total amount of fatty acids.

The consistency of margarine, being dependent on the solids content at different temperatures of the fat phase can be determined from its dilatation values as described in Journ. Am. Oil Chem. Soc. 31 (1954), pp. 98–103. The dilatation values described in this specification are determined by the method described in Boekenoogen: "Analysis and Characterization of Oils, Fats and Fat Products," 1964, Interscience Publishers, London pp. 143–145.

A margarine with good spreadability but which can nevertheless be satisfactorily packed in a wrapper should have fat phase dilatation values of at least 350 at 20° C. and at most 150 at 30° C., in order that it may have a good eating quality.

The present invention enables a relatively high poly-unsaturated fatty acid content and a relatively low saturated fatty acids content to be combined in a margarine fat from which margarine of good spreadability can be prepared and when packed in wrappers exhibits low oil exudation. In the compositions of the present invention a liquid fat containing at least 40% poly-unsaturated fatty acids is interesterified with another fat containing at least 10% of fatty acids having 20 to 22 carbon atoms hardened to a melting point of 42–48° C. Thus for instance, a margarine fat suitable for use in constituting the fat phase of a margarine of the kind referred to can be made by blending 45 to 65 parts of interesterification product with 55 to 35 parts of suitable additional fats.

All compositions are expressed by weight.

The fatty acid content in each composition is the total amount of fatty acids present in the composition.

The melting point is the slipping point, defined in Bailey "Melting and Solidification of Fats," Interscience Publishers Inc., New York, 1950, p. 110.

The ratio of the liquid to the hard fat in the interesterified mixture is preferably from 95:5 to 65:35, according to the amount of poly-unsaturated fatty acids in the liquid fat as well as the amount of saturated fatty acids in the hard fat.

Preferably the ratio of saturated to poly-unsaturated fatty acids in the margarine fat is at most 1, a ratio of from 0.4 to 0.8 being more preferred. Thus, if 30% of saturated fatty acids is incorporated in the margarine fat, preferably at least 30% of poly-unsaturated fatty acids should also be incorporated.

The interesterified mixture has a higher viscosity than its liquid fat component and a relatively high amount of essential fatty acids in comparison with the natural semi-liquid oils or in comparison with, for instance, slightly hydrogenated soybean oil.

The fat which contains at least 10% by weight of fatty acids with 20 to 22 carbon atoms may, for example, be hardened rapeseed, mustard, wallflower seed or nasturtium seed oil, marine oils or mixtures thereof. They may be hydrogenated with a fresh precipitated nickel or kieselguhr catalyst at a temperature from 150–180° C. and a pressure from atmospheric to 5 atm.

The liquid fat component used in the interesterified fat mixture may, for example, be sunflower, safflower, cottonseed, wheat germ, soybean, grapeseed, poppy seed, tobacco seed, rye, walnut, or corn oil or mixtures thereof.

The interesterification treatment may be carried out batchwise or continuously using suitable catalysts e.g. alkali metals, their hydrides, alkoxides and soaps, sodamide and titanium tetra-alkoxides.

The balance portion of a margarine fat blend according to the invention may comprise fats which may have been subjected to a hardening and/or interesterification treatment and preferably comprises 30–45% of a hardened fat or a mixture of hardened fats with a melting point of 32°–38° C., and up to 10% of a hardened fat or a mixture of hardened fats with a melting point of 42–48° C., the nature and relative amounts of the several components of the margarine oil being such that the required dilatation values and saturated and unsaturated fatty acds content are observed.

Suitably the balance may comprise oils hydrogenated in a conventional iso-promoting way to semi-solid fats having a melting point of approximately 32° to 38° C. and with steep dilatometric curves. Such fats have relatively few saturated fatty acids, at most 35% and a trans-fatty acid content of at least 40%. The preferred range of the trans-fatty acid content is 55–65%, and of the saturated fatty acid content 15–20%. Preferably an iso-promoting sulphur-poisoned hydrogenation catalyst is used in the hydrogenation, for example, 1.5% of a sulphur-poisoned nickel catalyst, precipitated on kieselguhr, at temperatures from 150°–180° C. In this way it is possible to obtain hardened fats containing 50–70% of trans-acids and 10–30% of saturated fatty acids.

This hardening treatment may also be carried out with a non-poisoned nickel catalyst precipitated on kieselguhr and not previously used. These catalysts are especially used with oil, e.g. certain types of soybean oil, which do not remain stable as regards flavour after treatment with an iso-promoting catalyst. Such oils therefore are preferably hardened with a fresh nickel catalyst as described at temperatures of about 180° C. or in two or more stages, first at about 100° C. and then at about 180° C. With these catalysts also high trans-fatty acid contents may be obtained, e.g. of 40–60% by weight, and also relatively low saturated fatty acid contents, e.g. of 20–30% by weight based on the total amount of fatty acids. Thus with this type of hardening the formation of trans-acids is not promoted by the choice of the catalyst but by the temperature level at which the hydrogenation is carried out.

Fractions of hydrogenated fats may also make up the balance of the fat blends for margarine. This fractionation treatment is carried out, removing a major part of the tristearines and increasing the proportion of trans-acids, until a fraction with a melting point of 32°–38° C. is obtained.

The fractionation of the hydrogenated fat may be carried out with the aid of solvents or in the presence of an aqueous solution containing a small amount of a wetting agent, and by a dry fractionation method as hereinafter described. In general a method is preferred in which the hydrogenated fat is heated to about 60° C., quickly cooled to 40° C., followed by gradual cooling to 33°–36° C. in about 4 hours and subsequently kept at this temperature for 2 hours. The cooling should be carried out under gentle stirring. After the crystallisation period the stearins are filtered off in the usual way. The olein, containing at least 40% of trans-acids, is obtained in a yield of at least 50%, the amount depending on the fatty acid composition of the hydrogenated fat. For example, from hydrogenated soybean oil 20–30% is removed and from other suitable oils 15–25%.

A relatively large amount of trans-acid is required in the make-up fat in order to give the margarine fat enough firmness, as expressed by the desired dilatation value of at least 350 at 20° C.

Oils which are suitable for hydrogenation to constitute the make-up fat, if necessary after fractionation, include groundnut, rapeseed, sunflower, safflower, soybean, fish and cottonseed oil and mixtures thereof.

The make-up fat may include, as a third component in margarine fat blends according to the present invention, a hardened fat having a melting point of 42°–48° C., e.g. hardened palm, cottonseed, or marine animal oil, or tallow or mixtures theerof. These fats are usually hardened, with a fresh nickel catalyst precipitated kieselguhr, at a temperature from 150 to 180° C. and a pressure from atmospheric to 5 atm. Preferably this is a different species from the hardened fat component of the interesterified mixture.

This additional component is especially suitable for overcoming the phenomenon in the margaine product, of sandiness which sometimes appears when glyceride oils containing relatively large amounts of fatty acids with 20 to 22 carbon atoms are used. Without this hardened component these higher fatty acids will sometimes recrystallize on storage, which may be caused by a transition from the beta prime to the beta modification of the crystallized glycerides, which results in a less desirable grainy product.

The saturated and trans-fatty acid contents of a number of components suitable for use in the margarine fat according to the present invention are shown in the following table.

| Oil | Percent Saturated fatty acid | Percent Trans-fatty acid |
| --- | --- | --- |
| Sunflower oil | 12 | Nil |
| Sunflower oil, hardened to melting point of 37° C | 19 | 60 |
| Rapeseed oil, hardened to melting point of 36° C | 14 | 60 |
| Rapeseed oil, hardened to melting point of 32° C | 10 | 67 |
| Safflower oil, hardened to melting point of 37° C | 18 | 59 |
| Soybean oil, hardened to melting point of 38° C | 28 | 43 |
| Cottonseed oil, hardened to melting point of 32° C | 25 | 59 |
| Cottonseed oil, hardened to melting point of 36° C | 27.5 | 58 |
| Fish oil, hardened to melting point of 32° C | 33 | 75 |
| Rapeseed oil, hardened to melting point of 45° C | 27 | 46 |
| Palm oil, hardened to melting point of 45° C | 55 | 25 |

Preferably the components having melting ranges of 32–38° C. and 42–48° C. are derived from the same oil. Margarine prepared from the margarine fat blends according to the present invention may be manufactured in a conventional closed tubular surface-scraped heat exchanger as described in "Margarine" by A. J. C. Andersen and P. N. Williams, Pergamon Press, 1965, pp. 246 et seq. Votator arrangements as described in British patent specification 639,743, British patent specification 650,481 and British patent specification 765,870 are especially suitable.

The margaine may also be prepared by means of the conventional cooling drums, described in the same book by Andersen and Williams.

The following examples illustrate the invention:

EXAMPLE 1

Hardening of rapeseed oil to melting point of 45° C.

Refined rapeseed oil having an iodine value of 100 and containing 45% of fatty acids with 20 to 22 carbon atoms, was hydrogenated in a stirred batch vessel at 180° C. for 1 hour in the presence of 0.15% by weight of nickel precipitated on kieselguhr, the catalyst containing 60% of nickel. The product fat was freed from catalyst and had a slip melting point of 45° C., an iodine value of 60.1, and contained 27% of saturated fatty acids and 46% trans-fatty acids.

Hardening of rapeseed oil to melting point of 36° C.

Another batch of the same rapeseed oil was hydrogenated as before for 1.5 hours in the presence of 1.5% by weight of nickel in the form of a sulphur-poisoned nickel on kieselguhr catalyst containing 25% by weight of nickel and 0.5% by weight of sulphur.

After removing catalyst the slip melting point of the hardened product was 36° C., the iodine value 70.2, and it contained 14% saturated fatty acids, 60% trans-acids.

A batch of refined safflower oil having an iodine value of 149 was similarly hydrogenated to a slip melting point of 37° C., an iodine value of 76.9, 18% saturated fatty acids and 59% trans-fatty acids.

Hardening of soybean oil to melting point of 38° C.

A refined soybean oil having an iodine value of 130, was hydrogenated batchwise at atmospheric pressure in two stages, first at 100° C. to an iodine value of 102 and then at 180° C. to an iodine value of 68, in the presence of 0.15% nickel fresh precipitated on kieselguhr, the catalyst containing 60% by weight of nickel.

The hardened soybean oil had a slip melting point of 38° C. and contained 28% by weight of saturated fatty acids and 43% by weight of trans-fatty acids.

Interesterification

A mixture of 10 parts sunflower oil and 1 part of the rapeseed oil hardened to 45° C. are dried to a water content of 0.01% by weight and subsequently interesterified at 110° C. in a stirred vessel which was kept under a vacuum of 2 cm. mercury, in the presence of 0.1% by weight of sodium methoxide as a catalyst. After 20 minutes the mixture was cooled and the vacumm released. The catalyst was destroyed by washing the interesterified mixture with 10% of 0.1 N aqueous lye. The interesterified mixture was then washed with water and dried as before.

A margarine fat blend was made of the following composition from the above components:

50% sunflower oil (interesterified)
5% rapeseed oil hardened to a melting point of 45° C. (interesterified)
20% rapeseed oil hardened to a melting point of 36° C.
7.5% soybean oil harden to a melting point of 38° C.
17.5% safflower oil hardened to a melting point of 37° C.

The fatty acid composition of the margarine fat blend was:

| $C_{14}$ | $C_{16}$ | $C_{16}{/}$ | $C_{18}$ | $C_{18}{/}$ | $C_{18}{/\!\!=}$ | $C_{18}{/\!\!\equiv}$ | $C_{20}$ | $C_{20}{/}$ | $C_{22}$ | $C_{22}{/}$ |
|---|---|---|---|---|---|---|---|---|---|---|
| 0.5 | 7.0 | 0.5 | 7.5 | 37.0 | 33.5 | 2.0 | 1.0 | 2.5 | 2.0 | 6.5 | in which:

$/$ means one double bond $/\!\!=$ means two double bonds $/\!\!\equiv$ means three double bonds 28% of the unsaturated fatty acids had a trans-configuration.

The margarine fat blend was subsequently melted and emulsified with an aqueous phase prepared from soured milk in the presence of 0.1% monodiglycerides as emulsifier to give an emulsion containing 84% of fat.

The emulsion was crystallized and worked in a Votator A-unit comprising a closed tubular surface-scraped heat exchanger, which it left at a temperature of 15° C. The cooling temperatures in the A-unit were from −6° to −10° C. and 40% of the treated emulsion was recirculated. Thereafter the crystallized emulsion was moved through a Votator B-unit comprising a resting tube where it crystallized further for 160 sec. and was then printed.

The ratio of saturated fatty acids to poly-unsaturated fatty acids in the margarine was about 0.5.

The fat blend dilatations were:

$D_{15}$ ---------------------------------------- 530
$D_{20}$ ---------------------------------------- 420
$D_{25}$ ---------------------------------------- 290
$D_{30}$ ---------------------------------------- 145
$D_{35}$ ---------------------------------------- 40

The hardness of the margarine measured by the method of A. J. Haighton as described in J. Am. Oil Chemists Soc. 36 (1959), pp. 345–348, was:

Temperature (° C.)            Hardness (g./cm.)$^2$
15 ---------------------------------------- 690
20 ---------------------------------------- 255
22.5 -------------------------------------- 150
25 ---------------------------------------- 70

After one week's storage at 20° C. no oil exudation of the margarine samples was observed.

EXAMPLE 2

A margarine was prepared from different amounts of the same basic materials as described in Example 1 except that the fat blend contained a hydrogenated palm oil hardened to 45° C. under similar conditions as the rapeseed oil component.

The margarine fat blend composition was as follows:

50% sunflower oil (interesterified)
5% rapeseed oil hardened to melting point of 45° C. (interesterified)
7.5% rapeseed oil hardened to melting point of 36° C.
30% safflower oil hardened to melting point of 37° C.
7.5% palm oil hardened to melting point of 45° C.

The fatty acid composition of the margarine fat blend was:

| $C_{12}$ | $C_{14}$ | $C_{16}$ | $C_{16}{/}$ | $C_{18}$ | $C_{18}{/}$ | $C_{18}{/\!\!=}$ | $C_{18}{/\!\!\equiv}$ | $C_{20}$ | $C_{20}{/}$ | $C_{22}$ | $C_{22}{/}$ |
|---|---|---|---|---|---|---|---|---|---|---|---|
| 0.5 | 0.5 | 9.0 | 0.5 | 7.5 | 38.0 | 33.0 | 2.0 | 1.0 | 1.5 | 2.0 | 4.5 |

27% of the unsaturated fatty acids had a trans-configuration.

The margarine prepared from this fat blend had a ratio of saturated fatty acids to poly-unsaturated fatty acids of about 0.07.

The dilatations were:

$D_{15}$ ---------------------------------------- 545
$D_{20}$ ---------------------------------------- 420
$D_{25}$ ---------------------------------------- 290
$D_{30}$ ---------------------------------------- 130
$D_{35}$ ---------------------------------------- 10

The hardness values were:

Temperature (°C.)            Hardness (g./cm.$^2$)
15 ---------------------------------------- 1065
20 ---------------------------------------- 490
22.5 -------------------------------------- 375
25 ---------------------------------------- 200

The properties of the margine stored at 20° C. were excellent.

EXAMPLE 3

Margarine was made as described in Example 1 from a margarine fat blend of the following composition:

50% sunflower oil (interesterified)
12.5% rapeseed oil hardened to a melting point of 45° C. (interesterified)
17.5% rapeseed oil hardened to a melting point of 35° C.
20% safflower oil hardened to a melting point of 37° C.

The fatty acid composition of the margarine fat blend was:

| $C_{12}$ | $C_{14}$ | $C_{16}$ | $C_{16}{'}$ | $C_{18}$ | $C_{18}{'}$ | $C_{18}{'}{=}$ | $C_{18}{'}{\equiv}$ | $C_{20}$ | $C_{20}{'}$ | $C_{22}$ | $C_{22}{'}$ |
|---|---|---|---|---|---|---|---|---|---|---|---|
| 0.5 | 1.5 | 10.5 | 2.0 | 7.5 | 32.0 | 30.0 | 2.5 | 1.0 | 2.5 | 2.0 | 8.0 |

29% of the unsaturated fatty acids had a trans-configuration and the ratio of saturated to poly-unsaturated fatty acids was about 0.8.

The dilations were:

$D_{15}$ ---------------------------------- 530
$D_{20}$ ---------------------------------- 405
$D_{25}$ ---------------------------------- 275
$D_{30}$ ---------------------------------- 130
$D_{35}$ ---------------------------------- 20

The hardness values were:

| Temperature (°C.) | Hardness (g./cm.$^2$) |
|---|---|
| 15 | 1050 |
| 20 | 350 |
| 22.5 | 165 |
| 25 | 70 |

The margarine showed no oil exudation after one week's storage at 20° C.

EXAMPLE 4

A margine was prepared from a margarine fat blend of the following composition, prepared as before:

42% sunflower oil (interesterified)
18% rapeseed oil hardened to melting point of 45° C. (interesterified)
10% soybean oil hardened to melting point of 38°C.
30% safflower oil hardened to melting point of 37° C.

The individual components used were hardened and/or interesterified as described in Example 1.

The fatty acid composition of the fat blend was:

| $C_{12}$ | $C_{14}$ | $C_{16}$ | $C_{16}{'}$ | $C_{18}$ | $C_{18}{'}$ | $C_{18}{'}{=}$ | $C_{18}{'}{\equiv}$ | $C_{20}{'}$ | $C_{22}$ | $C_{22}{'}$ |
|---|---|---|---|---|---|---|---|---|---|---|
| 0.5 | 0.5 | 7.5 | trace | 7.0 | 41.5 | 32.5 | 0.5 | 1.5 | 2.0 | 6.0 |

30% of the unsaturated fatty acids had a trans-configuration.

The margarine was prepared in the same equipment and under the same conditions as used in Example 1.

The ratios of saturated fatty acids to poly-unsaturated fatty acids was about 0.7.

The dilatations were:

$D_{15}$ ---------------------------------- 555
$D_{20}$ ---------------------------------- 395
$D_{25}$ ---------------------------------- 265
$D_{30}$ ---------------------------------- 150
$D_{35}$ ---------------------------------- 55

The hardness values were:

| Temperature (°C.) | Hardness (g./cm.$^2$) |
|---|---|
| 15 | 1100 |
| 20 | 300 |
| 22.5 | 130 |
| 25 | 80 |

The margarine showed no oil exudation after one week's storage at 20° C.

What is claimed is:

1. A fat composition suitable for the preparation of good spreadable margarines with low oil exudation properties and having a dilatation value at 20° C. of at least 350 and at 30° C. of at most 150, having a polyunsaturated fatty acid content of at least 25% and a saturated fatty acid content of at most 30%, said fat composition comprising:
    (a) about 45 to 65 parts by weight of an interesterified product of a mixture of fat containing
        (i) a liquid fat containing at least 40% polyunsaturated fatty acids and
        (ii) from about 5 to 35 parts by weight of fat hardened to melt at 42 to 48° C. and containing at least 10% $C_{20}$ to $C_{22}$ fatty acids;
    (b) about 30 to 45 parts by weight of a fat hardened to a melting point of from 32 to 38° C. and having a trans-acid content of at least 40% and a saturated fatty acid content of at most 35%; and
    (c) about 0 to 10 parts by weight of a fat hardened to a melting point of 42 to 48° C.

2. A fat composition according to claim 1 in which the polyunsaturated fatty acid is linoleic acid.

3. A fat composition according to claim 2, in which the trans acid content of the said fat of melting point 32° to 38° C. is 55–65% and its saturated fatty acid content is 15–20%.

4. A fat composition according to claim 1 in which the trans-acid content is 55 to 65% and the saturated fatty acid content is 15 to 20%.

5. A fat composition according to claim 1 in which the fats comprise edible vegetable oils.

6. A fat composition according to claim 1 in which the hardened fat component of the interesterified mixture is selected from the group consisting of rapeseed, mustard seed, wallflower seed, or nasturitum seed oil.

7. A fat composition according to claim 1 in which the liquid fat component of the interesterified mixtures is selected from the group consisting of sunflower, safflower, cottonseed, wheat germ, soybean, grapeseed, poppy seed, tobacco seed, rye, walnut and corn oil.

8. A fat composition according to claim 5 in which the fat of melting point 42° to 48° C. is selected from the group consisting of hardened palm oil and hardened cottonseed oil.

9. A fat composition according to claim 5 in which the fat of melting point 42° to 48° C. is selected from the group consisting of hardened tallows and hardened marine oils.

References Cited

UNITED STATES PATENTS 2,921,855  1/1960  Melnick et al. _____ 99—122MO

OTHER REFERENCES

Andersen et al., "Margarine," 1965, 2nd ed., Pergamon Press: New York, pp. 68 to 73.

JOSEPH M. GOLIAN, Primary Examiner

U.S. Cl. X.R.
99—118